US012734467B2

(12) United States Patent
Ball et al.

(10) Patent No.: US 12,734,467 B2
(45) Date of Patent: Sep. 15, 2026

(54) SEPTIC TANK EFFLUENT FILTERS

(71) Applicant: Orenco Systems, Inc., Sutherlin, OR (US)

(72) Inventors: Eric S. Ball, Roseburg, OR (US); Terry R Bounds, Roseburg, OR (US)

(73) Assignee: Orenco Systems, Inc., Sutherlin, OR (US)

(*) Notice: Subject to any disclaimer, the term of this patent is extended or adjusted under 35 U.S.C. 154(b) by 275 days.

(21) Appl. No.: 18/526,907

(22) Filed: Dec. 1, 2023

(65) Prior Publication Data

US 2024/0091680 A1 Mar. 21, 2024

Related U.S. Application Data

(63) Continuation-in-part of application No. 16/588,857, filed on Sep. 30, 2019, now abandoned.

(51) Int. Cl.
*B01D 29/23* (2006.01)
*B01D 29/70* (2006.01)

(52) U.S. Cl.
CPC ............ *B01D 29/23* (2013.01); *B01D 29/70* (2013.01)

(58) Field of Classification Search
None
See application file for complete search history.

(56) References Cited

U.S. PATENT DOCUMENTS 762,690 A * 6/1904 Connell .................. B30B 9/067 210/396
934,917 A * 9/1909 Huhsman ........... B01D 21/0039 405/53
1,120,351 A * 12/1914 Weston ................ B67D 1/0456 210/539
1,281,528 A * 10/1918 Davis ................. B01D 17/0208 D23/203
1,349,452 A * 8/1920 Griffith ................... C02F 3/288 210/538
(Continued)

FOREIGN PATENT DOCUMENTS

WO WO-9617669 A1 * 6/1996 ............. B01D 29/96

OTHER PUBLICATIONS

United States Patent and Trademark Office, Third Party Submission Under 37 CFR 1.290, U.S. Appl. No. 16/588,857, filed Apr. 4, 2022, 2 pages.
(Continued)

*Primary Examiner* — Robert J Popovics
(74) *Attorney, Agent, or Firm* — FINNEGAN, HENDERSON, FARABOW, GARRETT & DUNNER L.L.P.

(57) ABSTRACT

Filter vaults are shown and disclosed. In some embodiments, the filter vault includes an at least partially impervious and at least partially submersible filter housing. The housing includes an inlet opening that permits unfiltered wastewater having suspended solids to enter the housing. The filter vault further includes a filter assembly. The filter assembly includes one or more filter elements positioned within the housing. Each of the filter elements includes an upper end and a lower end. Each of the filter elements includes a filtering surface that is exposed to the unfiltered wastewater. The inlet opening allows accumulated solids from said filtering surface to exit said housing.

11 Claims, 5 Drawing Sheets

(56) References Cited

U.S. PATENT DOCUMENTS 1,458,796 A * 6/1923 Baumgardner ......... C02F 3/288 210/311
1,470,745 A * 10/1923 Johnson .................. C02F 3/288 210/262
1,601,611 A * 9/1926 Downey ................. C02F 3/288 210/299
1,633,080 A * 6/1927 Engle ...................... C02F 3/288 210/194
1,738,521 A * 12/1929 Bomhoff ................. C02F 3/288 210/336
1,877,507 A * 9/1932 Hendricks ................. C02F 3/28 210/538
1,902,171 A * 3/1933 Kopp ........................ C02F 3/28 210/301
2,364,472 A * 12/1944 Piatt .......................... C02F 3/28 210/260
2,767,801 A * 10/1956 Eads ....................... C02F 3/046 405/36
2,900,084 A * 8/1959 Zabel ........................ C02F 3/28 210/248
2,987,186 A * 6/1961 Burgoon ................... C02F 3/12 210/197
3,126,333 A * 3/1964 Williams .................. C02F 3/06 210/275
3,247,864 A * 4/1966 Conery ..................... E03F 5/22 417/7
3,332,552 A * 7/1967 Zabel ................... B01D 29/071 210/488
3,375,788 A * 4/1968 Solas ........................ E03F 5/22 137/364
3,630,370 A * 12/1971 Quina ..................... E03F 11/00 210/538
3,642,138 A * 2/1972 Sheda .................... B01D 24/04 210/259
3,658,176 A * 4/1972 Reid ........................ B65D 7/00 210/208
3,662,890 A * 5/1972 Grimshaw ................ C02F 3/26 210/220
3,898,162 A * 8/1975 Carlson ..................... C02F 3/28 210/170.08
3,933,641 A * 1/1976 Hadden ................... C02F 3/288 210/260
4,100,070 A * 7/1978 White ................... C02F 3/1215 210/279
4,224,155 A * 9/1980 Milne ................... C02F 3/1252 210/197
4,230,578 A * 10/1980 Culp ........................ G05D 9/12 340/623
4,319,998 A * 3/1982 Anderson ............... C02F 3/006 210/170.08
4,325,823 A * 4/1982 Graham ................ C02F 3/1252 210/207
4,439,323 A * 3/1984 Ball ................... B01D 35/0276 210/744
4,505,813 A * 3/1985 Graves .................... C02F 3/205 210/260
4,594,153 A * 6/1986 Weis ......................... E03F 5/22 210/171
4,608,157 A * 8/1986 Graves .................... C02F 3/205 210/411
4,710,295 A * 12/1987 Zabel ...................... C02F 3/288 210/488
4,715,966 A * 12/1987 Bowman ................. C02F 3/006 210/86
4,752,403 A * 6/1988 Allred .................... B01D 29/15 210/411
4,789,487 A * 12/1988 Wallace .................. E03F 11/00 210/170.08
4,832,846 A * 5/1989 Gavin ..................... C02F 1/006 210/534
4,933,076 A * 6/1990 Oshima ..................... C02F 1/76 210/764
4,959,145 A * 9/1990 Meyers ................... C02F 1/006 210/232
4,997,562 A * 3/1991 Warner .............. B01D 21/0012 210/259
5,198,113 A * 3/1993 Daniels .................. B01D 29/23 210/449
5,207,896 A * 5/1993 Graves ................ B01D 21/003 210/207
5,242,584 A * 9/1993 Hoarau ................... E03F 11/00 210/170.08
5,264,120 A * 11/1993 Graves ............... B01D 21/0039 210/207
5,290,434 A * 3/1994 Richard ............. B01D 21/2444 137/589
5,306,425 A * 4/1994 Graves ............... B01D 35/0276 210/764
5,360,556 A * 11/1994 Ball ........................ C02F 3/288 138/104
5,382,357 A * 1/1995 Nurse ................ B01D 21/0006 210/170.08
5,409,604 A * 4/1995 Graves .................... B01F 21/22 210/207
5,413,706 A * 5/1995 Graves ............... B01D 35/0276 210/207
5,427,679 A * 6/1995 Daniels .................. B01D 29/23 210/485
5,429,752 A * 7/1995 Presby .............. B01D 21/0042 210/802
5,480,561 A * 1/1996 Ball ....................... B01D 37/00 210/744
5,482,621 A * 1/1996 Nurse ................ B01D 21/0012 210/170.08
5,492,635 A * 2/1996 Ball ..................... B01D 35/027 210/802
5,507,628 A * 4/1996 Masse ................... F04D 29/607 417/423.15
5,531,894 A * 7/1996 Ball ........................ C02F 3/302 210/615
5,569,376 A * 10/1996 Graves ................... B01D 21/02 210/197
5,569,387 A * 10/1996 Bowne ............... B01D 21/0012 210/791
5,580,453 A * 12/1996 Nurse, Jr. .............. B01D 29/58 210/457
5,582,716 A * 12/1996 Nurse, Jr. .............. B01D 29/46 210/522
5,591,331 A * 1/1997 Nurse, Jr. ............ B01D 29/605 210/357
5,593,584 A * 1/1997 Nurse, Jr. ............... C02F 3/288 210/486
5,597,477 A * 1/1997 Harry, III ........... B01D 21/0012 210/138
5,609,754 A * 3/1997 Stuth ....................... C02F 3/288 210/151
5,618,445 A * 4/1997 Gavin ................ B01D 21/2444 210/800
5,620,602 A * 4/1997 Stuth ......................... C02F 3/04 210/615
5,635,064 A * 6/1997 Bovington ............. B01D 35/26 210/338
5,645,732 A * 7/1997 Daniels .................. B01D 29/96 210/804
5,667,689 A * 9/1997 Graves ...................... C02F 9/00 210/197
D386,241 S * 11/1997 Nurse, Jr. .................... D23/209
5,683,577 A * 11/1997 Nurse, Jr. .............. B01D 29/35 210/450
5,690,824 A * 11/1997 Stuth .................... B01D 29/668 210/522
5,736,035 A * 4/1998 Nurse, Jr. ............ B01D 29/035 210/256
5,759,393 A * 6/1998 Nurse, Jr. .............. B01D 29/96 210/357
5,762,790 A * 6/1998 Zoeller .................. B01D 29/52 210/295

(56) References Cited

U.S. PATENT DOCUMENTS 5,762,793 A * 6/1998 Nurse, Jr. .............. B01D 29/96 210/323.2
5,779,896 A * 7/1998 Nurse, Jr. .............. B01D 21/00 210/299
5,795,472 A * 8/1998 Nurse, Jr. ............ B01D 29/035 210/357
D402,349 S * 12/1998 Gavin .......................... D23/209
5,868,172 A * 2/1999 Graves ............... B01D 21/0012 138/DIG. 4
5,871,640 A * 2/1999 Gavin ................ B01D 35/0276 210/429
5,885,452 A * 3/1999 Koteskey ............... B01D 29/35 210/309
5,904,847 A * 5/1999 Bovington .............. C02F 3/288 210/462
5,985,139 A * 11/1999 Zoeller .................. B01D 29/52 210/488
5,989,416 A * 11/1999 Gorton ...................... C02F 3/04 210/197
5,997,735 A * 12/1999 Gorton ...................... C02F 9/00 210/197
6,015,488 A * 1/2000 Gavin ..................... C02F 3/288 210/441
D431,629 S * 10/2000 Meyers ........................ D23/209
6,129,837 A * 10/2000 Nurse, Jr. ............ B01D 35/143 210/86
6,132,599 A * 10/2000 Chaffee ................ B01D 24/002 210/197
6,136,190 A * 10/2000 Zoeller .................. B01D 29/58 210/337
6,177,004 B1 * 1/2001 Bracone, Jr. ......... B01D 24/425 210/259
6,187,183 B1 * 2/2001 Weaver ................... C02F 3/288 210/150
6,190,548 B1 * 2/2001 Frick ....................... C02F 3/288 210/252
6,217,760 B1 * 4/2001 Bovington ......... B01D 24/4869 137/118.01
6,231,762 B1 * 5/2001 Marshall, III ....... B01D 35/147 210/429
6,231,764 B1 * 5/2001 Wilkins ............. B01D 35/0276 210/393
6,234,200 B1 * 5/2001 Hall ................... B01D 17/0211 210/488
6,261,446 B1 * 7/2001 Cornick ............... B01D 21/307 210/197
6,261,452 B1 * 7/2001 Mayer ................ B01D 17/0211 210/256
6,277,280 B1 * 8/2001 Houck .................... C02F 3/288 210/616
6,287,469 B1 * 9/2001 Ashburn ................... C02F 3/30 210/263
6,306,299 B1 * 10/2001 Nurse, Jr. ............. B01D 29/46 210/488
6,309,539 B1 * 10/2001 Mayer ..................... C02F 3/288 210/138
6,319,403 B1 * 11/2001 Meyers ................ B01D 35/027 210/336
6,319,408 B1 * 11/2001 Zebuhr ................... C02F 3/288 210/624
6,331,247 B1 * 12/2001 Zoeller .................. B01D 29/58 210/337
6,338,797 B1 * 1/2002 Nurse, Jr. .......... B01D 35/0276 210/256
6,360,898 B1 * 3/2002 Nurse, Jr. ............ B01D 35/027 210/336
6,372,137 B1 * 4/2002 Bounds ................... C02F 3/103 210/605
6,416,664 B1 * 7/2002 Bovington ......... B01D 35/0276 210/337
6,416,667 B1 * 7/2002 Graves ...................... C02F 3/30 210/170.08
6,447,680 B1 * 9/2002 Richard ................. B01D 29/58 210/336
6,478,957 B1 * 11/2002 Terry, III ............... B01D 29/56 210/337
6,495,040 B1 * 12/2002 Zoeller .................. B01D 29/23 210/337
6,540,912 B1 * 4/2003 Nurse, Jr. ................. C02F 3/06 210/220
6,540,920 B2 * 4/2003 Bounds ................... C02F 3/103 210/615
6,551,508 B1 * 4/2003 Bovington ......... B01D 35/0276 210/256
6,554,996 B1 * 4/2003 Rebori .................... C02F 3/101 210/232
6,576,130 B2 * 6/2003 Wallace .................. C02F 3/046 210/260
6,592,755 B1 * 7/2003 Nurse, Jr. ................. C02F 3/04 210/150
6,616,832 B1 * 9/2003 Chaffee ..................... C02F 3/06 210/197
6,638,424 B2 * 10/2003 Stever ................ B01D 21/0006 210/170.03
6,652,743 B2 * 11/2003 Wallace .................... C02F 3/32 210/220
6,699,387 B2 * 3/2004 Bovington ............. B01D 35/26 210/256
6,749,743 B1 * 6/2004 Rohrer ............... B01D 21/0018 137/448
6,763,950 B2 * 7/2004 Graves .................... C02F 3/288 210/540
6,763,951 B2 * 7/2004 Graves ...................... C02F 3/30 210/513
6,764,111 B2 * 7/2004 Graves ...................... C02F 3/30 285/903
6,773,606 B2 * 8/2004 Wilkins ............... B01D 35/027 210/411
6,841,066 B2 * 1/2005 Nurse, Jr. ............. B01D 29/46 210/488
6,860,994 B2 * 3/2005 Graves .................... C02F 3/288 210/532.1
6,878,281 B2 * 4/2005 Graves ...................... C02F 3/30 405/129.27
6,890,433 B2 * 5/2005 Nurse, Jr. ............... C02F 3/288 210/456
6,908,548 B1 * 6/2005 Bruso ................... C02F 3/1242 210/259
6,913,155 B2 * 7/2005 Bryant ............... B01D 21/2405 210/521
6,923,905 B2 * 8/2005 Potts ....................... E03F 1/002 210/143
6,942,796 B2 * 9/2005 Lacasse ................. B01D 29/46 210/336
6,974,536 B2 * 12/2005 Chaffee ..................... C02F 3/06 210/291
6,979,398 B2 * 12/2005 Veilleux ................ C02F 3/1242 210/150
7,001,514 B1 * 2/2006 Liao .......................... C02F 3/02 210/219
7,001,527 B2 * 2/2006 Stever ................ B01D 17/0214 210/801
7,160,460 B2 * 1/2007 Terry, III ................ C02F 3/288 210/615
7,261,819 B2 * 8/2007 Jordan .................... C02F 1/008 210/687
7,264,720 B2 * 9/2007 Hoffmeier ............ A01K 63/045 210/418
7,282,143 B2 * 10/2007 Liao ....................... B01D 21/02 210/195.3
7,294,260 B2 * 11/2007 McKinney ............ C02F 3/1247 210/220
7,309,419 B2 * 12/2007 Rhorer ............... B01D 21/0012 137/122
7,413,656 B2 * 8/2008 Allen .................... C02F 3/1242 210/791
7,455,780 B1 * 11/2008 Joyner ...................... E03F 5/18 210/906

(56) References Cited

U.S. PATENT DOCUMENTS

| | | | | | |
|---|---|---|---|---|---|
| 7,497,946 | B2 * | 3/2009 | Jessick | E03F 1/002 | 405/51 |
| 7,513,995 | B2 * | 4/2009 | James | B01D 21/2466 | 210/220 |
| 7,578,398 | B2 * | 8/2009 | Lord | C02F 3/288 | 210/615 |
| 7,582,211 | B2 * | 9/2009 | Lord | B01D 39/04 | 210/615 |
| 7,615,156 | B2 * | 11/2009 | Lenger | C02F 3/20 | 210/615 |
| 7,638,065 | B2 * | 12/2009 | Stever | C02F 1/004 | 210/170.03 |
| 7,666,301 | B2 * | 2/2010 | Graves | C02F 1/006 | 210/232 |
| 7,674,372 | B2 * | 3/2010 | Graves | B01D 21/0012 | 210/232 |
| 7,682,512 | B2 * | 3/2010 | Terry, III | E03F 11/00 | 210/336 |
| 7,691,272 | B2 * | 4/2010 | Graves | B01D 21/0012 | 210/744 |
| 7,740,756 | B2 * | 6/2010 | Hornback | C02F 3/288 | 210/488 |
| 7,857,973 | B1 * | 12/2010 | Pickney | B01D 35/0276 | 210/256 |
| 7,976,713 | B2 * | 7/2011 | Ball | C02F 1/001 | 210/806 |
| 8,002,996 | B1 * | 8/2011 | Pickney | B01D 35/0276 | 210/791 |
| 8,038,871 | B1 * | 10/2011 | Durham | G01F 23/363 | 210/86 |
| 8,075,774 | B2 * | 12/2011 | Terry, III | B01D 21/2444 | 210/488 |
| 8,133,394 | B2 * | 3/2012 | Gustafsson | B01D 21/0018 | 210/624 |
| 8,137,544 | B1 * | 3/2012 | Graves | C02F 3/1242 | 210/150 |
| 8,182,676 | B2 * | 5/2012 | Terry, III | B01D 21/0012 | 210/170.08 |
| 8,182,685 | B2 * | 5/2012 | Terry | B01D 21/0012 | 210/488 |
| 8,226,833 | B1 * | 7/2012 | Terry | B01D 35/0276 | 210/336 |
| 8,333,894 | B1 * | 12/2012 | Terry | E03F 11/00 | 210/336 |
| 8,641,894 | B1 * | 2/2014 | Bennatt | C02F 3/1263 | 417/54 |
| 8,679,335 | B1 * | 3/2014 | Dufort | B01D 29/6438 | 210/791 |
| 8,871,089 | B2 * | 10/2014 | Early | B65D 90/10 | 210/207 |
| 9,169,130 | B1 * | 10/2015 | Gauthier | B01D 63/10 | |
| 9,233,323 | B1 * | 1/2016 | Gavin | F16L 21/00 | |
| 9,469,962 | B1 * | 10/2016 | LeBlanc | E02D 27/32 | |
| 9,605,688 | B2 * | 3/2017 | Perez | C02F 1/001 | |
| 9,931,590 | B2 * | 4/2018 | Gavin | B01D 35/0276 | |
| 10,167,216 | B2 * | 1/2019 | Graves | C02F 9/00 | |
| 10,273,175 | B2 * | 4/2019 | Jowett | E03F 5/18 | |
| 10,322,957 | B2 * | 6/2019 | Graves | C02F 3/1242 | |
| 10,543,439 | B2 * | 1/2020 | Perez | F04D 1/00 | |
| 10,626,592 | B2 * | 4/2020 | Dubois | B01D 29/52 | |
| 10,676,383 | B2 * | 6/2020 | Graves | C02F 9/00 | |
| 10,697,169 | B2 * | 6/2020 | Baker | C02F 1/006 | |
| 10,968,617 | B2 * | 4/2021 | Duperon | B01D 21/2461 | |
| 11,465,080 | B1 * | 10/2022 | Hornback | B01D 21/0087 | |
| 11,471,798 | B2 * | 10/2022 | Vallejo | C02F 1/006 | |
| 11,484,819 | B2 * | 11/2022 | Wnuk | B01D 29/52 | |
| 11,717,775 | B2 * | 8/2023 | Maiworm | A23D 9/04 | 210/323.1 |
| 11,731,890 | B2 * | 8/2023 | Reynolds | C02F 3/1242 | 210/605 |
| 11,974,526 | B2 * | 5/2024 | McClain | A01G 25/00 | |
| 12,083,458 | B1 * | 9/2024 | Hornback | B01D 21/2444 | |
| 12,140,139 | B2 * | 11/2024 | Gannon | B01D 39/1623 | |
| 12,180,090 | B2 * | 12/2024 | Hagopian | B01D 29/05 | |
| 12,215,555 | B2 * | 2/2025 | John | B01D 37/046 | |
| 12,226,712 | B2 * | 2/2025 | Gannon | C02F 1/281 | |
| 12,330,093 | B2 * | 6/2025 | Nehlen, III | B01D 29/90 | |
| 12,330,094 | B2 * | 6/2025 | Nehlen, III | B01D 29/17 | |
| 12,378,758 | B2 * | 8/2025 | Klabunde | F04D 15/0218 | |
| 12,528,034 | B2 * | 1/2026 | Nehlen, III | B01D 29/52 | |
| 2002/0134720 | A1 * | 9/2002 | Bovington | B01D 29/58 | 210/238 |
| 2002/0139736 | A1 * | 10/2002 | Stever | B01D 17/0211 | 210/170.03 |
| 2002/0148781 | A1 * | 10/2002 | Graves | C02F 3/30 | 210/620 |
| 2002/0148782 | A1 * | 10/2002 | Graves | C02F 3/288 | 210/620 |
| 2002/0153304 | A1 * | 10/2002 | Bounds | C02F 3/30 | 210/209 |
| 2002/0153305 | A1 * | 10/2002 | Graves | C02F 3/288 | 210/620 |
| 2002/0153306 | A1 * | 10/2002 | Graves | C02F 3/30 | 210/620 |
| 2003/0010713 | A1 * | 1/2003 | Graves | C02F 3/30 | 210/620 |
| 2003/0052057 | A1 * | 3/2003 | Terry, III | B01D 29/46 | 210/488 |
| 2003/0066790 | A1 * | 4/2003 | Rebori | C02F 3/101 | 210/150 |
| 2003/0085182 | A1 * | 5/2003 | Wilkins | B01D 35/26 | 210/299 |
| 2003/0141229 | A1 * | 7/2003 | Chaffee | B01D 35/26 | 210/194 |
| 2003/0209478 | A1 * | 11/2003 | Nurse Jr. | B01D 29/071 | 210/256 |
| 2003/0222033 | A1 * | 12/2003 | Carroll, II | C02F 3/288 | 210/805 |
| 2004/0069715 | A1 * | 4/2004 | Stever | B01D 21/0039 | 210/170.03 |
| 2004/0074846 | A1 * | 4/2004 | Stever | B01D 21/003 | 210/801 |
| 2004/0099588 | A1 * | 5/2004 | Nurse, Jr. | C02F 3/043 | 210/150 |
| 2004/0099589 | A1 * | 5/2004 | Terry, III | C02F 3/04 | 210/150 |
| 2004/0251198 | A1 * | 12/2004 | Lord | C02F 3/10 | 210/615 |
| 2005/0000871 | A1 * | 1/2005 | Rhorer | E03F 11/00 | 210/123 |
| 2005/0161398 | A1 * | 7/2005 | Couch | C02F 3/1242 | 210/150 |
| 2006/0043016 | A1 * | 3/2006 | Liao | C02F 3/28 | 210/532.2 |
| 2006/0180546 | A1 * | 8/2006 | Stuth | C02F 3/22 | 210/151 |
| 2006/0196827 | A1 * | 9/2006 | Liao | B01D 21/0018 | 210/521 |
| 2006/0201869 | A1 * | 9/2006 | Collins | B01D 29/52 | 210/86 |
| 2006/0226071 | A1 * | 10/2006 | Allen | C02F 3/1242 | 210/220 |
| 2006/0283795 | A1 * | 12/2006 | Nurse | C02F 3/06 | 210/151 |
| 2007/0068856 | A1 * | 3/2007 | Chaffee | C02F 3/103 | 210/264 |
| 2007/0068878 | A1 * | 3/2007 | Stever | B01D 21/2433 | 210/170.03 |
| 2007/0084781 | A1 * | 4/2007 | Hornback | B01D 35/0276 | 210/323.1 |
| 2007/0144962 | A1 * | 6/2007 | Lord | B01D 39/04 | 210/506 |
| 2007/0144963 | A1 * | 6/2007 | Lord | C02F 3/1215 | 210/506 |
| 2008/0017574 | A1 * | 1/2008 | Lenger | C02F 3/343 | 210/615 |
| 2008/0164216 | A1 * | 7/2008 | Collins | B01D 29/52 | 210/744 |

(56) References Cited

U.S. PATENT DOCUMENTS

| | | | | |
|---|---|---|---|---|
| 2008/0237106 | A1* | 10/2008 | Jessick | C02F 3/288 210/170.08 |
| 2009/0008338 | A1* | 1/2009 | Dunbar | E03F 11/00 210/741 |
| 2009/0026121 | A1* | 1/2009 | James | C02F 3/288 210/170.08 |
| 2009/0065412 | A1* | 3/2009 | Mbarki | C02F 3/2806 210/151 |
| 2009/0223891 | A1* | 9/2009 | Gauthier | B01D 65/02 210/170.08 |
| 2010/0012557 | A1* | 1/2010 | Chaffee | C02F 3/2846 210/86 |
| 2010/0078373 | A1* | 4/2010 | Chaffee | C02F 3/10 210/226 |
| 2010/0224577 | A1* | 9/2010 | Ball | C02F 1/001 210/803 |
| 2012/0228117 | A1* | 9/2012 | Panunzio | C02F 9/00 203/10 |
| 2014/0076800 | A1* | 3/2014 | Graves | C02F 9/00 210/195.3 |
| 2016/0199763 | A1* | 7/2016 | Gavin | B01D 35/0276 285/285.1 |
| 2016/0230378 | A1* | 8/2016 | Baumann | F16L 55/07 |
| 2016/0288023 | A1* | 10/2016 | Wright | B01D 21/307 |
| 2017/0275193 | A1* | 9/2017 | Graves | C02F 9/00 |
| 2018/0291911 | A1* | 10/2018 | Ward | F04F 5/10 |
| 2018/0297876 | A1* | 10/2018 | Jowett | E03F 3/04 |
| 2021/0063290 | A1* | 3/2021 | Boucher | G01N 1/34 |
| 2021/0087088 | A1* | 3/2021 | Drewery | C02F 3/006 |
| 2021/0093987 | A1* | 4/2021 | Ball | E03F 5/14 |
| 2021/0188681 | A1* | 6/2021 | Boucher | C02F 3/00 |
| 2021/0387880 | A1* | 12/2021 | Reynolds | C02F 3/1242 |
| 2022/0143534 | A1* | 5/2022 | Vallejo | B01D 29/902 |
| 2023/0212029 | A1* | 7/2023 | Hagopian | B01D 29/05 210/256 |
| 2023/0226470 | A1* | 7/2023 | Strasser | B01D 29/66 210/798 |
| 2023/0271113 | A1* | 8/2023 | Kamath | G06F 30/17 210/268 |
| 2024/0091680 | A1* | 3/2024 | Ball | B01D 35/26 |
| 2024/0131456 | A1* | 4/2024 | Nehlen, III | B01D 29/52 |
| 2024/0158271 | A1* | 5/2024 | Reynolds | C02F 3/288 |
| 2024/0226782 | A9* | 7/2024 | Nehlen, III | B01D 29/52 |
| 2025/0115500 | A1* | 4/2025 | Hagopian | C02F 3/288 |

OTHER PUBLICATIONS

United States Patent and Trademark Office, Office Action regarding U.S. Appl. No. 16/588,857, filed Jul. 21, 2022, 7 pages.

United States Patent and Trademark Office, Office Action regarding U.S. Appl. No. 16/588,857, filed Feb. 13, 2023, 13 pages.

United States Patent and Trademark Office, Final Office Action regarding U.S. Appl. No. 16/588,857, filed Sep. 1, 2023, 6 pages.

Stepros Self-Flushing Septic Tank Pump Vault Animation (stepros.com), YouTube Video, https://www.youtube.com/watch?v=hTLQCiwG5AE; 2 pages, Dec. 3, 2018, last accessed on May 24, 2024.

* cited by examiner 112
132
160
158
135
127
134
154
140
138
126
168
156
124
157
150
144
142
128
151
166
122
152
130
135
127
120
137
110
136
160
132

SEPTIC TANK EFFLUENT FILTERS

CROSS-REFERENCES TO RELATED APPLICATIONS

This application is a continuation-in-part of U.S. patent application Ser. No. 16/588,857, which was filed on Sep. 30, 2019 and entitled "PASSIVE SELF-CLEANING FILTRATION METHOD AND APPARATUS." The complete disclosure of the above application is hereby incorporated by reference for all purposes.

FIELD

This invention relates to a method and apparatus for filtering a liquid containing suspended solids.

BACKGROUND

Domestic sewage wastewater having waste solids is often collected in a wastewater treatment container, such as a septic tank, for primary treatment. As the wastewater travels through the septic tank from the inlet to outlet, the solids resolve into an upper horizontal scum layer, a lower horizontal sludge layer, and an intermediate horizontal relatively "clear" layer of wastewater containing suspended solids. Suspended solids in the clear layer also include solids lifted from the sludge layer by gas bubbles created as part of the decomposition process and solids from the scum layer precipitating downwardly through the clear layer toward the sludge layer.

In gravity flow septic tanks, effluent wastewater from the clear layer is released from the tank in response to inflow of new wastewater. Often the wastewater is delivered to the tank in pulses with quiescent periods between the pulses. Typically the wastewater in the tank is maintained at a certain level or within a certain range. Wastewater delivered to the tank typically results in corresponding discharge from the tank. Discharging filtered wastewater is beneficial to downstream treatment, such as a drainfield. In some cases it is necessary or preferable to pump the effluent from a tank. In such cases the pump is often enclosed in a pump vault and wastewater from the clear layer is filtered prior to passing through the pump and out of the tank. The present invention relates to filtering liquids containing suspended solids.

The problem of filtering or screening solids from wastewater and the accompanying problem of removing the solids that are collected or lodged on the screen or filter has been a matter of interest to those in the wastewater treatment industry for some time. Examples of prior devices and methods in the wastewater treatment context may be seen in Ball, U.S. Pat. No. 4,439,323, Zabel, U.S. Pat. No. 4,710,295, and Ball, U.S. Pat. No. 5,492,635. The complete disclosures of the above patents are hereby incorporated by reference for all purposes.

BRIEF SUMMARY

A filter vault with an impervious and at least partially submersible housing is configured to permit wastewater containing suspended solids to enter the housing. A filter element positioned in the housing has a filtering surface that is exposed to unfiltered wastewater. An impervious barrier is arranged to create within the housing an upper chamber. The first barrier cooperates with said housing to functionally prevent passage of unfiltered wastewater into said upper chamber. The first barrier has one or more apertures cooperating with one or more filter elements to functionally prevent passage of the unfiltered wastewater into said upper chamber except through the filter element(s).

DETAILED DESCRIPTION

Figure 1:
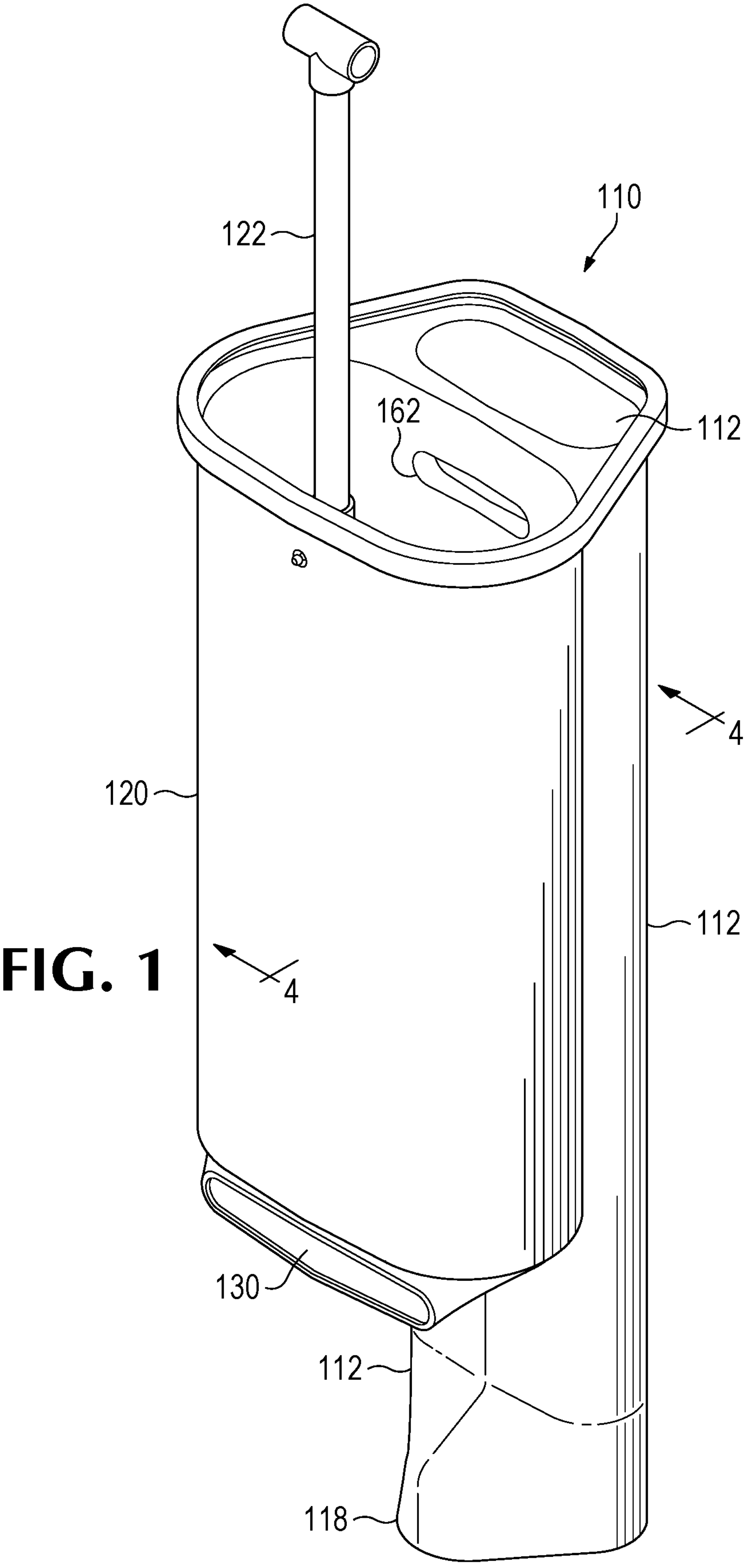
FIG. 1 is a perspective view of an exemplary filter vault embodying the present invention.
Figure 3:
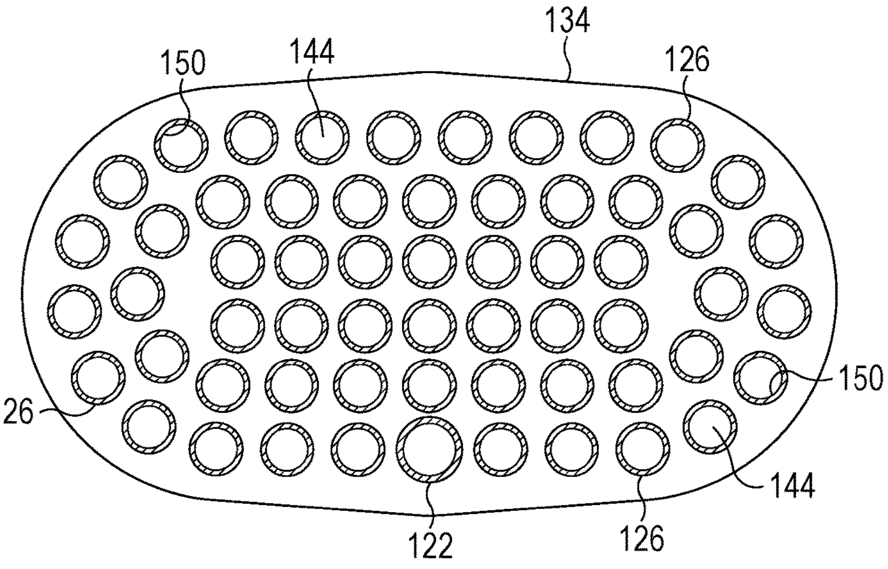
FIG. 3 is a sectional view of the filter assembly of FIG. 2 taken along lines 3-3.
Figure 2:
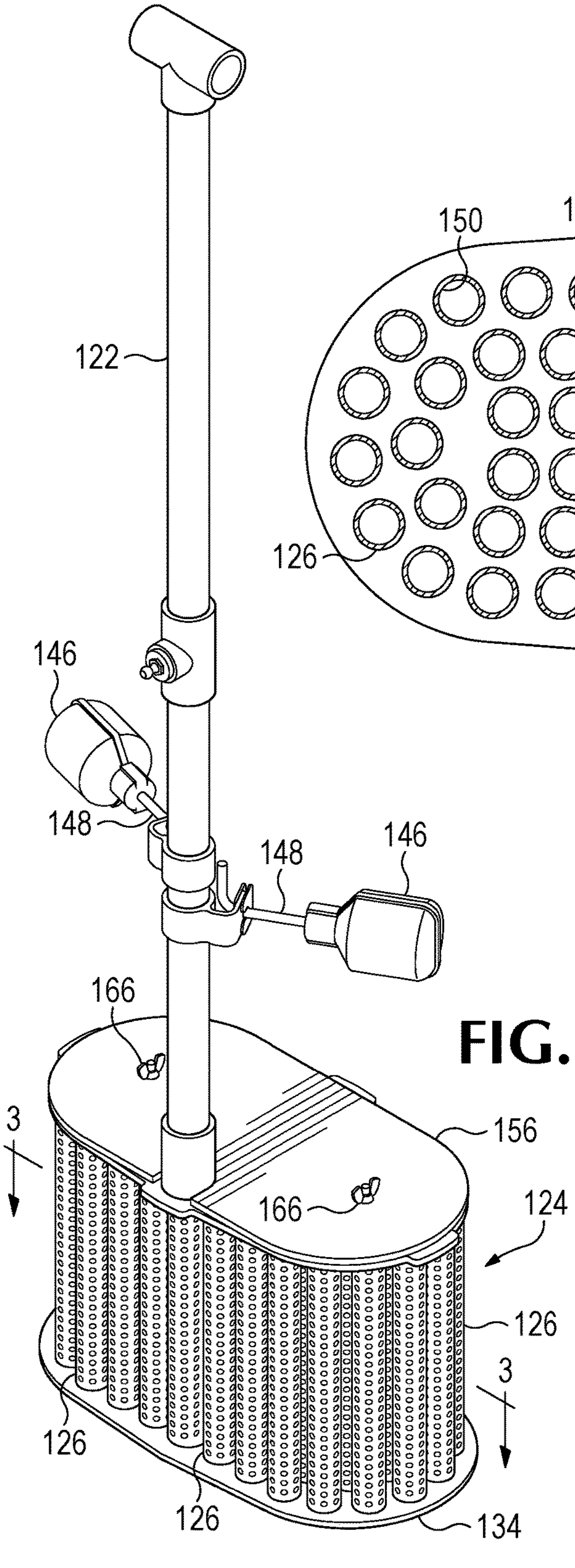
FIG. 2 is a perspective view of a filter assembly including multiple filter elements.
Figure 4:
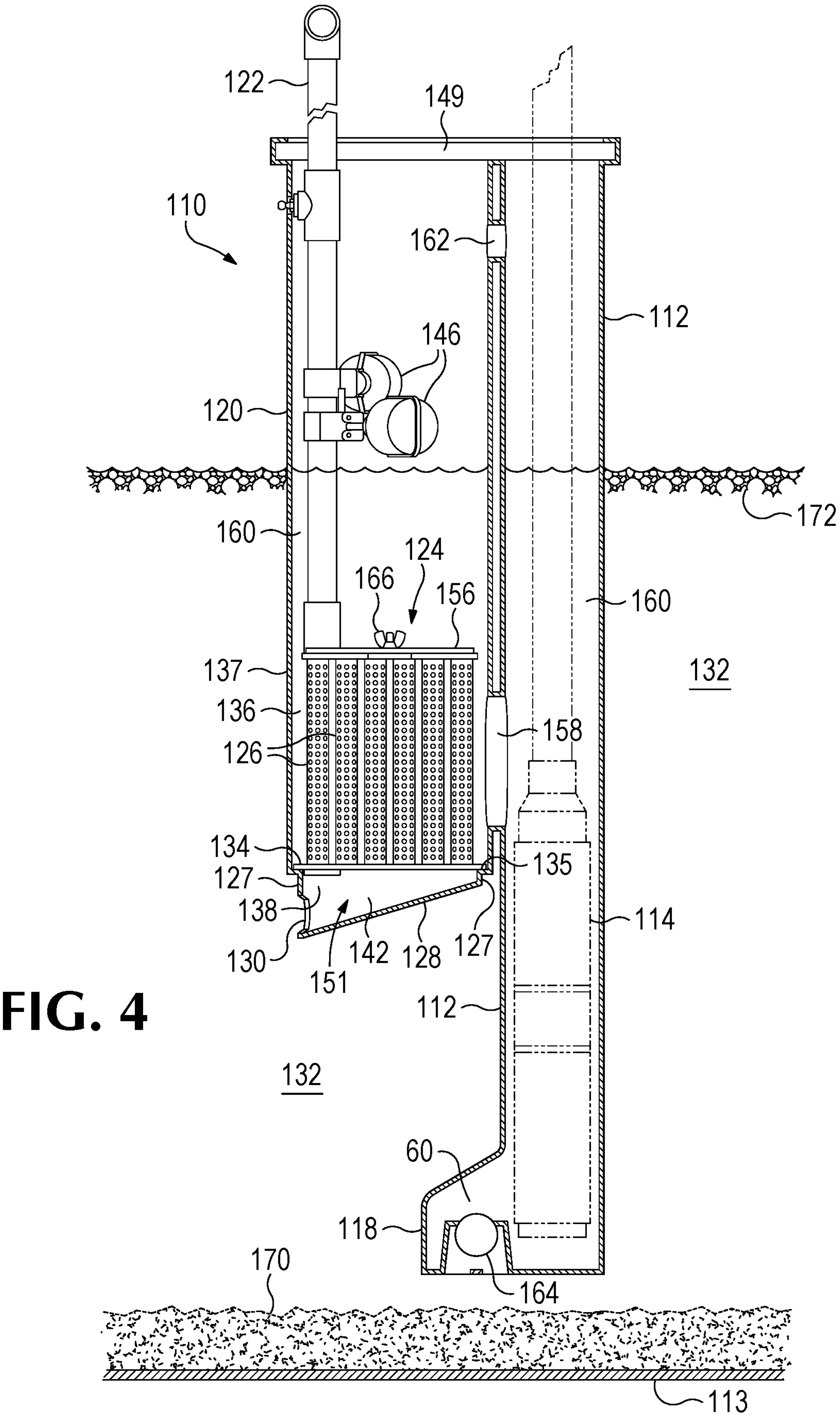
FIG. 4 is a sectional view of the filter vault of FIG. 1 taken along lines 4-4 of FIG. 1.

Referring to FIGS. 1 and 4, a filter vault 110 is shown in combination with a pump closet 112 enclosing an effluent pump 114. The pump closet 112 includes a foot 118 enclosing a ball valve 164. The filter vault 110 includes an impervious filter housing 120 at least partially enclosing a float tree 122 supporting float switches 146 on pivotable arms 148 (as shown in FIG. 2), and a filter assembly 124, including multiple filter elements in the form of filter tubes 126. The filter housing 120 has a sloping floor 128 and an inlet or inlet opening 130 for permitting unfiltered wastewater 142 from the "clear" layer 132 of the wastewater to enter into the filter housing 120. As will be described below, the inlet 130 also serves as a discharge or outlet portal for accumulated solids from filter assembly 124. In the example shown, filter housing 120 includes a single inlet for the unfiltered wastewater and that inlet is also the single outlet for the accumulated solids. In other words, filter housing 120 includes only one inlet for the unfiltered wastewater and that inlet is the only outlet for the accumulated solids.

Referring to FIGS. 2-5, the filter vault 110 additionally includes an impervious first barrier or lower tube sheet 134, which is separate and distinct from filter assembly 124. In other words, the first barrier 134 is separate and independent from filter assembly 124 and its filter tubes 126. The first barrier 134 rests on a ledge 135 on the inner circumference of the filter housing 120 to create or define, within the filter housing 120, an upper chamber 136 above the first barrier 134 and a lower chamber 138 below the first barrier 134. In other words, upper chamber 136 may be defined by first barrier 134 (bottom of the upper chamber), wall(s) 137 of filter housing 120 (side of the upper chamber), and/or upper edge portion(s) 149 of wall(s) 137 (top of upper chamber). The first barrier may be attached to filter tubes 126 via fusing, welding, and/or other suitable methods of attachment.

In the example shown in FIGS. 2-5, the first barrier 134 also functions as a base for the filter assembly 124 and supports a plurality of upright, elongate filter tubes 126 above the first barrier 134. In this exemplary embodiment each filter tube 126 has an upright wall defining an interior space 144 within the filter tube 126. The upright wall is perforated with multiple filtering holes 154. The inner surface of the filter tube 126 serves as a filtering surface 150. Except for the filtering holes 154, the filtering surface 150 is smooth (e.g., planar and/or free from projections, protuberances, depressions, and cavities) to discourage accumulation of solids from the unfiltered wastewater 142 on the filtering surface. A smooth surface also makes it easier for the accumulated solids to fall off the filtering surface 150 and through the open bottoms 152 of the filter tubes 126. The first barrier 134 has a plurality of apertures 140 matching the number of filter tubes 126. The bottoms 152 of the filter tubes 126 are open and are fitted or attached to the apertures 140 in the first barrier 134 to permit passage of unfiltered wastewater 142 into and out of the filter tubes 126.

Figure 5:
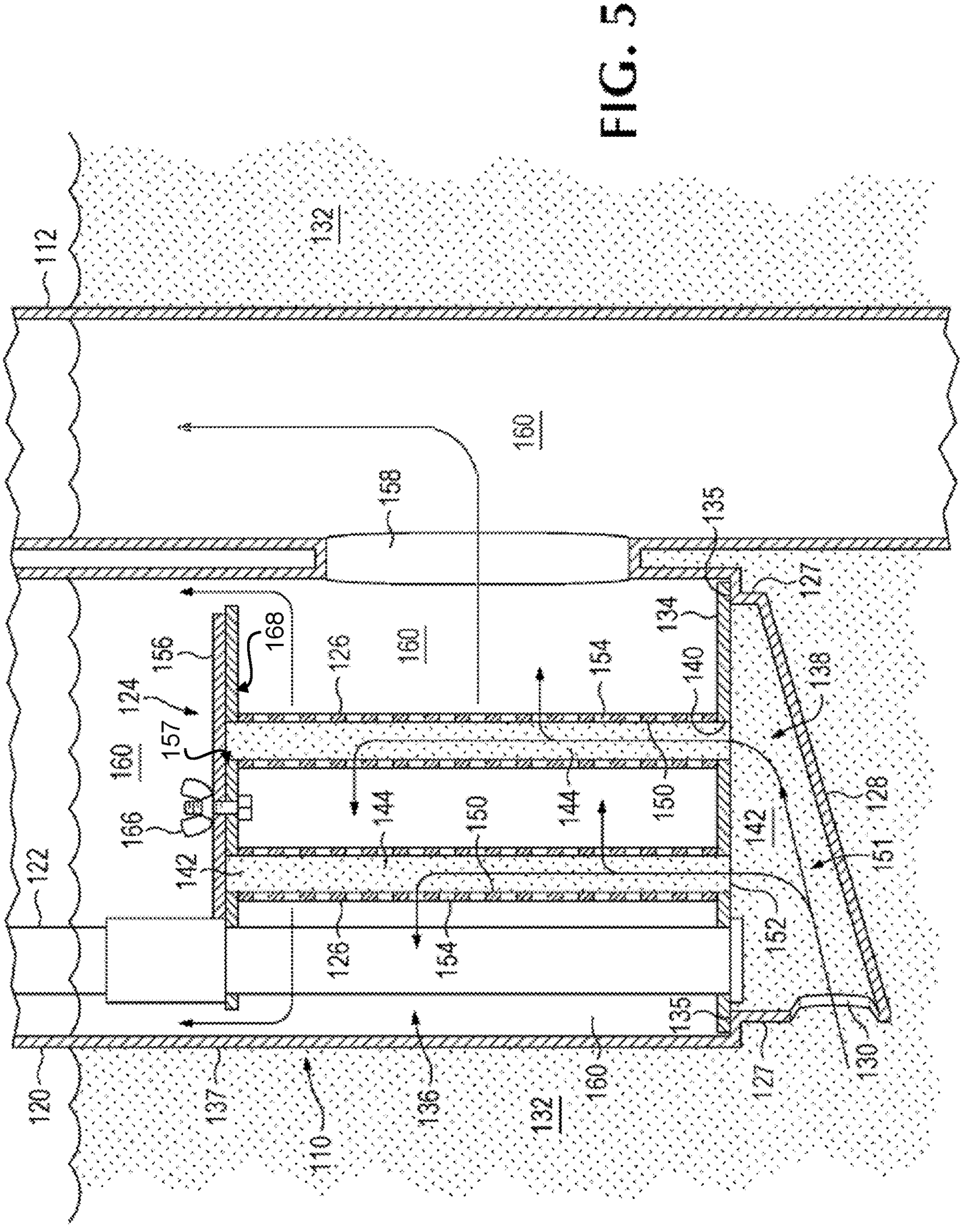
FIG. 5 is a partial sectional view of the filter vault and filter assembly of FIG. 4 including two exemplary filter elements showing the flow of wastewater from the clear layer through the filter elements and out of the filter assembly.

As may be seen in FIG. 5, the open bottoms 152 of the filter tubes 126 face the sloping floor 128 in lower chamber 138 such that the interior space 144 and smooth filtering surface 150 of the filter tubes 126 are exposed to unfiltered wastewater 142 having suspended solids (represented by the small dots) from the clear layer 132. The sloping floor slopes downward and/or toward inlet opening 130. The sloping floor 128 lies directly beneath the interior space 144 and the filtering surface 150 with no intervening structures between the open bottom 152 of the filter tube 126 and the sloping floor 128. In other words, lower chamber 138 may be defined by one or more external walls 127 (sides of the lower chamber), sloping floor 128 (bottom of the lower chamber), and/or first barrier 134 (top of lower chamber) that collectively define an open area 151, which is free from any structures positioned within such area. There are no structures that, for example, are attached to, or formed with, the floor and/or wall(s) and that extend into the open area. Solids that are collected in the interior space 144 of the filter tubes 126 or lodged on the smooth filtering surface 150 are free to settle directly downwardly (such as via gravitational forces) to the sloping floor 128. Such solids may be referred to as "accumulated solids" or "filtered solids." The accumulated solids migrate to an exit portal, which in the exemplary embodiment also serves as the inlet opening 130. In other words, in the exemplary embodiment shown, opening 130 serves as both the inlet for unfiltered wastewater 142 and the outlet for the accumulated solids. Thus, the inlet opening for unfiltered wastewater solids is at the same elevation or height (i.e., never higher) that the exit or outlet for the filtered or accumulated solids.

As seen in FIGS. 2 and 4-5, the filter assembly 124 also includes a lid 156 which sits atop a second barrier or upper tube sheet 168 having apertures 157, and covers the open tops of the filter tubes 126, functionally preventing unfiltered wastewater 142 from passing into the upper chamber 136 except through the filter holes 154 in the filtering surface 150 of the filter tubes 126. Accordingly, in the exemplary embodiment all wastewater above the first barrier 134 is filtered wastewater 160, having passed through the filtering holes 154 substantially reducing the size and number of suspended solids. Referring to FIGS. 4-5, there is a passageway 158 leading out of the upper chamber 136 and into the pump closet 112 enabling the filtered wastewater 160 to be pumped out of the septic tank 113. In a system that does not employ a pump 114, the filtered wastewater from the upper chamber 136 is discharged from the tank 113 for further treatment. In the example shown in FIGS. 4-5, there is only a single inlet for the unfiltered wastewater 142 (which also is the only outlet for the filtered solids) and only a single passageway 158 for the filtered wastewater. Other examples of filter vault 110 may, however, include two or more inlets and/or two or more outlets. In other embodiments, there is no floor so that accumulated solids may fall freely into the tank's interior space below the vault. In those embodiments, the tank interior space below the vault may function as a lower chamber, and the open filter tube bottoms 152 may function as inlet openings.

Operation of the exemplary embodiment of the filter vault 110 is shown in FIG. 5. The pump 114, not shown in FIG. 5, draws filtered wastewater 160 from the upper chamber 136, into the pump closet 112 through passageway 158 and pumps it out of the septic tank 113. Operation of the pump 114 creates a negative pressure in the upper chamber 136 drawing unfiltered wastewater 142 from the clear layer 132 into the lower chamber 138, up into the filter tubes 126 and through the filter holes 154 in the filtering surface 150. Suspended solids are collected in the filter tubes 126 and sometimes lodge on the smooth filtering surface 150. When the suspended solids collected in the filter tubes 126 and on the filtering surface 150 coalesce to a sufficient mass, the resulting accumulated solids are drawn by gravity out of the open bottom 152 of the filter tube 126, onto the sloping floor 128 and then out of the lower chamber 138 through the inlet/portal 130.

When the pump 114 ceases to draw filtered wastewater 160 from the upper chamber 136, unfiltered wastewater 142 with suspended solids is no longer drawn up into the filter tubes 126, and accumulated solids collected in the filter tubes 126 and on the filtering surface 150 are more likely to be drawn by gravity out of the filter tubes 126, down onto the sloping floor 128 and out the portal/inlet 130. Note that there are no intervening structures between the open bottoms 152 of the filter tubes 126 and the sloping floor 128 to interfere with accumulated solids falling to the floor 128. Additionally, in the exemplary embodiment shown, filter vault 110 does not include any mechanical cleaning devices, such as nozzles, tubes, channels, pipes, flow devices, or venturi effect flushing devices, to remove accumulated solids and/or move the accumulated solids away from the filter assembly and/or toward the inlet opening 130. For example, filter vault 110 does not include any fluid nozzles directed toward the upper and/or lower chambers to periodically or regularly flush out accumulated solids and/or move those solids toward the inlet opening 130, such as by using a side stream of the filtered wastewater. In other words, filter vault 110 does not include any active cleaning devices and instead can be referred to as a "passive self-cleaning" filter vault because the accumulated solids settle at the bottom and exit the opening 130 without the aid of any active cleaning devices.

In a gravity tank where there is no pump 114, the inflow of unfiltered wastewater into the tank creates a slight positive pressure on the upstream side of the filtering surface 150, pushing unfiltered wastewater 142 into the interior space 144 of the filter tubes 126, against the filtering surface 150, through the filtering holes 154, into the upper chamber 136 as filtered wastewater 160 and then out of the upper chamber 136 to a discharge port. As described above, suspended solids collect in the filter tubes 126, on the upstream side of the filtering surface 150 and eventually fall out of the open bottom 152 of the filter tube 126 and down onto the floor 128 of the filter housing 120 as accumulated solids. Introducing unfiltered wastewater 142 into the tank in pulses, such as occurs in a normal septic system, affords a quiescent period between pulses when there is no positive pressure on the upstream side of the filtering surface 150 and the accumulated solids are more likely to fall out of the filter tubes 126 and onto the floor 128.

Even though the passive self-cleaning aspect of the filter vault is effective to control the accumulation of solids on the filtering surface 150, it might be beneficial to clean the filter assembly 124 occasionally for maximum efficiency. Referring to FIGS. 1 and 4 the pump vault 110 may be lifted wholly or partially out of the septic tank 113 using a handle 162 formed in the walls separating the filter housing 120 and pump closet 112. The filter housing 120 protects the filter assembly 124 and float switches 146 from contact with the accumulated material in the scum layer 172. The foot 118 of the pump closet 112 has a ball valve 164 that permits filtered wastewater 160 in the pump closet 112 to drain out of the pump closet 112 to facilitate access to the pump 114. Filtered wastewater 160 in the upper chamber 136 can drain into the lower chamber 138 through the filtering surface and filtered and unfiltered wastewater 142 in the lower chamber 138 of the filter housing 120 may drain into the tank 113 through the inlet/portal 130. Reverse flow of the filtered wastewater 160 through the filtering surface 150 can flush accumulated solids out of the filter tubes 126. As shown in FIGS. 2, 4, and 5 the lid 156 of the filter assembly 124 is held over the filter tubes 126 by easily accessible fasteners 166. Removing the lid 156 exposes filtering surface 150 inside the filter tubes 126. Using a stream of water or mechanical tools, the smooth filtering surface 150 of the filter tubes 126 may be easily cleaned of accumulated solids which will then fall into the lower chamber 138, off the sloping floor 128, and out the inlet/portal 130.

Figure 6:
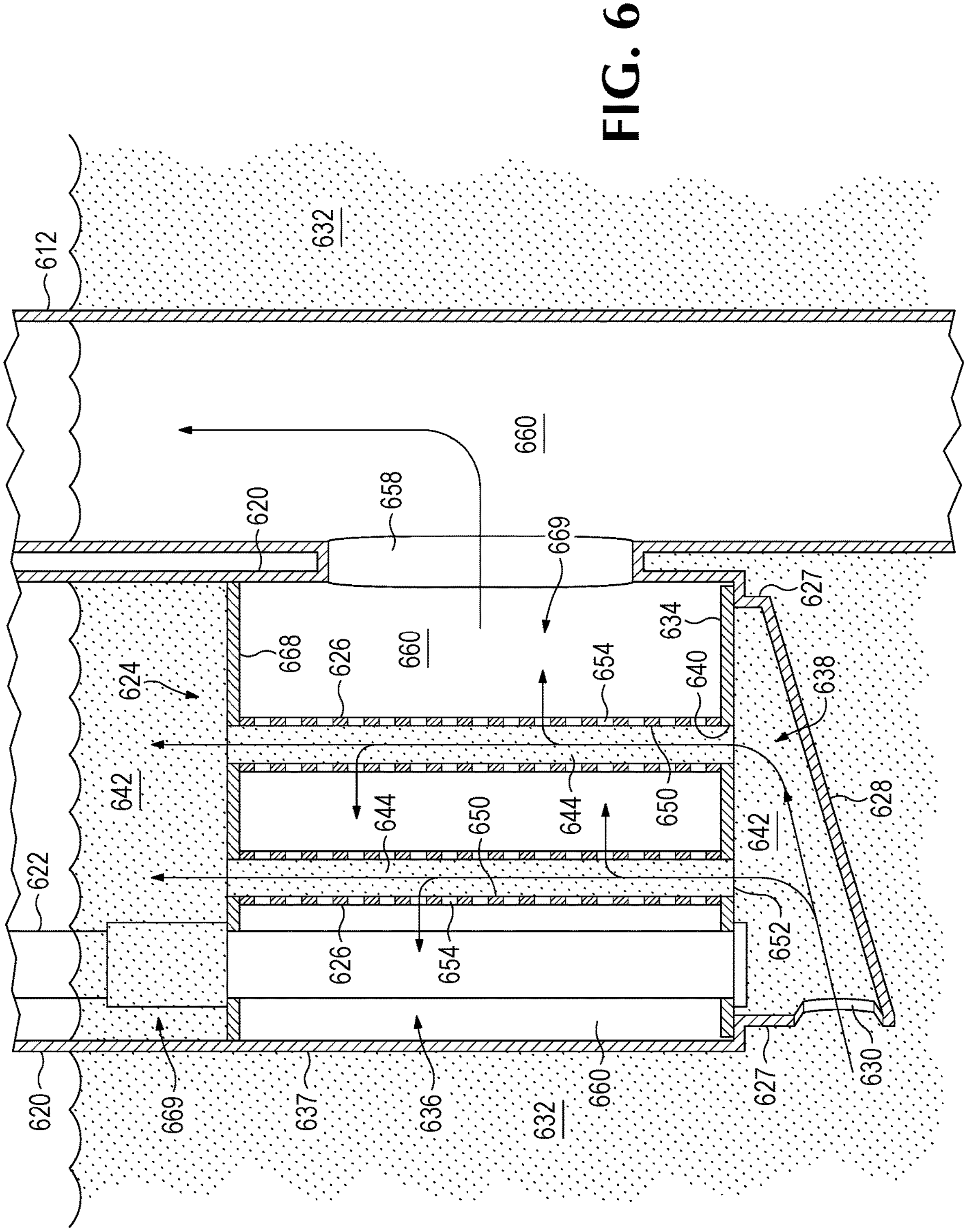
FIG. 6 is a partial sectional view of an alternative embodiment of the filter vault and filter assembly, including two exemplary filter elements showing the flow of wastewater through the filter elements, and out of a filter chamber.

The alternative embodiment shown in FIG. 6 is also passively self-cleaning (e.g., no mechanical cleaning devices are required to remove accumulated solids and/or move such solids toward the inlet opening 130), but is easier to clean. As with the exemplary embodiment, the filter housing 620 of the alternative embodiment at least partially enclosing a float tree 622. The filter housing 620 also includes a first barrier 634 creating or defining within said filter housing 620 an upper chamber 636 and a lower chamber 638. The first barrier 634 supports two exemplary filter tubes 626. Like the prior exemplary embodiment, the filter tubes 626 have open bottoms 652, which are fitted to apertures 640 in the first barrier 634. These filter tubes 626 also include an interior space 644, an upright wall including a smooth filtering surface 650, and open bottoms 652 facing a sloping floor 628. However, unlike the exemplary embodiment shown in FIGS. 1-5, the tops of the filter tubes 626 are uncovered. Unfiltered wastewater 642 from the clear layer 632 is permitted to pass upwardly into a superior chamber 669. A second barrier 668 fits to the tops of the filter tubes 626 and is snug to the walls of the filter housing 620 to create, between the first barrier 634 and the second barrier 668, the upper chamber 636 in fluid connection with the pump closet 612 through the passageway 658. Only filtered wastewater 660 that has passed through the filtering holes 654 of the filtering surface 650 is permitted into upper chamber 636 and through the passageway 658. Thus, lower chamber 638 may be defined by first barrier 634 (top of the lower chamber), external walls 627 (sides of the lower chamber), and/or sloping floor 628 (bottom of the lower chamber). Additionally, upper chamber 636 may be defined by second barrier 668 (top of the upper chamber), walls 637 of filter housing 620 (sides of the upper chamber), and/or first barrier 634 (bottom of the upper chamber). Moreover, superior chamber 669 may be defined by second barrier 668 (bottom of the superior chamber), wall(s) 637 of filter housing 620 (sides of the superior chamber), and/or upper edge portion (s) of wall(s) 637 (top of the superior chamber).

Operation of the alternative embodiment is similar to the first embodiment in that operation of the pump, not shown in FIG. 6, creates a negative pressure in the upper chamber 636 drawing unfiltered wastewater 642 with suspended solids up into the filter tubes 626 and through the filter holes 654 creating a reservoir of filtered wastewater 660 in the upper chamber 636. Like the exemplary embodiment, when the pump is not drawing filtered wastewater 660 from upper chamber 636, the accumulated solids are no longer pulled toward the filtering surface 650, and tend to fall via gravity out the open bottom 652 of the filter tubes 626 onto the sloping floor 628 and out of the lower chamber 638 through the inlet/portal 630.

Similarly in a situation without a pump, pulsed inflow of unfiltered wastewater 642 creates periods of increased pressure on the upstream side of the filtering surface 650, and periods of equal pressure when accumulated solids collected in the filter tube 626 and on the filtering surface 650 are more likely to be pulled by gravity toward the sloping floor 628.

A feature of the second embodiment is that it is easier to clean. Once the filter housing 620 is pulled at least partially out of the unfiltered wastewater 642 in the septic tank 613, the filtering surfaces 650 of the filter tubes 626 are exposed and may be cleaned by a stream of water or mechanical means without having to unfasten or remove a cover and/or lid.

In FIG. 6, first barrier 634 and second barrier 668 create within the filter housing 620 three separate chambers, a lower chamber 638, an upper chamber 636, and a superior chamber 669. The juncture between the housing 620 and the first and second barriers 634, 668 does not have to be watertight, but it should be sufficiently tight to functionally prevent passage of unfiltered wastewater 642 having solid particles larger than the filtering holes 654. As used in this application, "functionally preventing passage of unfiltered wastewater" means that particles larger than the filtering holes 654 in the filtering surface 650 will not pass. Similarly, the junction between the filter tubes 626 and the first and second barriers 634, 668 must functionally prevent passage of unfiltered wastewater 642 having suspended solids larger than the filtering holes 654 in the filtering surface 650. The same is true with respect to the exemplary embodiment in FIGS. 2-5. The juncture of the first barrier 134 with the filter housing 120, and the juncture of the first barrier 134 and filter tubes 126 must functionally prevent passage of unfiltered wastewater 142. The fit between the barriers 134, 634, 668 and the filter housing 120, 620 preferably permits the filter assembly 124, 624 to be lifted out of the filter housing 120, 620 for cleaning, repair, or replacement of the filter assembly 124, 624.

Components described above as "impervious," such as the impervious housing, the impervious first barrier, and/or the impervious second barrier may be made of any suitable materials that are impervious to water and/or wastewater, such as various thermoset and/or thermoplastic materials (e.g., polypropylene, polyethylene, dicyclopentadiene, and fiber-reinforced polyester). Impervious components may be used in the above embodiments to create fluid boundaries and/or direct flow of water and/or wastewater only through holes or opening in those components. For example, the impervious first barrier may prevent passage of the unfiltered wastewater except through the filter tubes that are received in the holes or openings of the first barrier.

Although the present invention is shown and described in the context of a septic tank with effluent pump, the invention relates to any wastewater container containing suspended solids. The filtering apparatus and method described herein is suitable for wastewater containers that do not use a pump.

Although the embodiments shown herein are described as the exemplary embodiment and the alternative embodiment, it should be understood that there may be more embodiments that manifest the present invention.

Although the exemplary filter element is shown as an upright cylindrical tube 126 with the entire inner tube wall acting as a filtering surface 150 the invention is not so limited. The filter element may be of many shapes; frustoconical for example, and it is not required that the entire inner surface operate as a filtering surface 150.

Although the embodiments presented herein are described with a lower chamber 138 having an inlet opening 130 in the filter housing 120, a lower chamber 138, and a floor 128, a floor in the housing is not necessary for passive self-cleaning operation. In embodiments without such floor to form a lower chamber within the confines of the housing, the lower edge portion(s) of the wall(s) of the filter housing and/or the tank's interior space below the filter vault may function as a lower chamber and the open filter tube bottoms 152 may function as inlet openings, allowing accumulated solids to fall freely into the tank's interior space below the filter vault.

While the foregoing is directed toward exemplary embodiments of the present invention, other and further embodiments of the invention may be devised without departing from the scope thereof which is defined by the claims.

What is claimed is:

1. A filter vault, comprising:

a filter housing including:

a lower tube sheet sealingly spanning a lower interior of the filter housing functionally preventing passage of unfiltered wastewater, and having a plurality of apertures extending therethrough;

an upper tube sheet substantially spanning an upper interior of the filter housing having a plurality of apertures extending therethrough;

an inlet opening below the lower tube sheet, positioned to introduce wastewater to be filtered into a lower chamber beneath the lower tube sheet;

a plurality of elongate filter elements each having a porous wall defining a hollow interior and being open at both ends, disposed within the filter housing, and extending between the lower tube sheet and the upper tube sheet, the respective apertures of the lower tube sheet, the hollow interior of each filter element and the apertures of the upper tube sheet being substantially aligned;

an outlet passageway extending through a wall of the filter housing and positioned between the lower tube sheet and the upper tube sheet permitting egress of filtered wastewater; and a pump closet defining an interior volume in fluid communication with the interior of the filter housing via outlet passageway for receiving filtered wastewater;

wherein, wastewater to be filtered enters the filter housing through the inlet, flows through chamber, through apertures, into the hollow interior of the elongate filter elements, and at least a portion of the wastewater flows through the porous wall producing filtered wastewater.

2. The filter vault of claim 1, wherein, the upper tube sheet sealingly spans the upper interior of the filter housing, functionally preventing passage of unfiltered wastewater.

3. The filter vault of claim 1, wherein, said lower chamber includes an open area and a floor that slopes downwardly toward the inlet opening to receive accumulated solids from an interior filtering surface of the elongate filter elements and allow said accumulated solids to exit said filter housing through said inlet opening.

4. The filter vault of claim 3, wherein, the open area is free from any structures positioned within or extending into the open area, so that solids are free to settle directly downwardly.

5. The filter vault of claim 1, wherein, the lower tube sheet rests on a ledge on an inner circumference of the filter housing.

6. The filter vault of claim 1, wherein, said filter vault is free from one or more cleaning devices that move said solids away from said elongate filter elements.

7. The filter vault of claim 1, wherein, said filter vault is free from one or more cleaning devices that move said solids toward said inlet opening.

8. The filter vault of claim 1, wherein, said elongate filter elements are tubes.

9. The filter vault of claim 1, wherein, the pump closet includes a foot enclosing a ball valve that permits filtered wastewater in the pump closet to drain out of the pump closet.

10. The filter vault of claim 1, further comprising:

a pump disposed in the pump closet for pumping filtered wastewater out of the pump closet.

11. The filter vault of claim 1, further comprising:

a lid which sits atop the upper tube sheet, and covers the open tops of the elongate filter elements, preventing unfiltered wastewater from passing into an upper chamber except through the porous wall of the filter elements.

* * * * *